United States Patent [19]
Ishibai et al.

[11] Patent Number: 5,004,330
[45] Date of Patent: Apr. 2, 1991

[54] ASPHERICAL GLASS LENS ELEMENT FORMED BY A LOW DISPERSION GLASS MATERIAL

[75] Inventors: Isao Ishibai; Hitonobu Otsu, both of Tokyo, Japan

[73] Assignee: Hoya Corporation, Tokyo, Japan

[21] Appl. No.: 494,983

[22] Filed: Mar. 16, 1990

[30] Foreign Application Priority Data

Mar. 17, 1989 [JP] Japan .................................. 1-66846

[51] Int. Cl.$^5$ .............................................. G02B 13/18
[52] U.S. Cl. .................................................... 350/432
[58] Field of Search ................ 350/432, 433, 434, 435

[56] References Cited

U.S. PATENT DOCUMENTS

| | | | |
|---|---|---|---|
| 4,449,792 | 5/1984 | Arai et al. | 350/432 |
| 4,571,031 | 2/1986 | Nakamura | 350/432 |
| 4,641,929 | 2/1987 | Braat | 350/432 |
| 4,743,093 | 5/1988 | Oinen | 350/432 |
| 4,765,723 | 8/1988 | Takamura | 350/432 |
| 4,768,867 | 9/1988 | Suda | 350/432 |
| 4,842,388 | 6/1989 | Tanaka et al. | 350/432 |
| 4,902,113 | 2/1990 | Ishiwara | 350/432 |
| 4,902,114 | 2/1990 | Arai | 350/432 |
| 4,932,763 | 6/1990 | Matsuoka | 350/432 |

Primary Examiner—Scott J. Sugarman
Attorney, Agent, or Firm—Ladas & Parry

[57] ABSTRACT

In an aspherical lens element which has an optical axis, a focal length f, a thickness D along the optical axis, and first and second aspherical convex surfaces defined by first and second predetermined formulae represented as functions of first and second radii $r_1$ and $r_2$ of curvature at apexes of the first and the second aspherical convex surfaces and first and second coefficients $k_1$ and $k_2$ of cones, the aspherical lens element is formed by a low dispersion glass material which has a refractive index n and an Abbe number $\nu$ specified by:

$$1.44 < n < 1.55,$$

and $$75 < \nu < 90.$$

In addition, the aspherical lens element is defined by:

$$1.5 < (f/D) < 1.9,$$

$$-0.4 < (r_1/r_2) < -0.2,$$

and $$10 < k_1 \cdot k_2 - 1000 E_1 < 30.$$

5 Claims, 10 Drawing Sheets

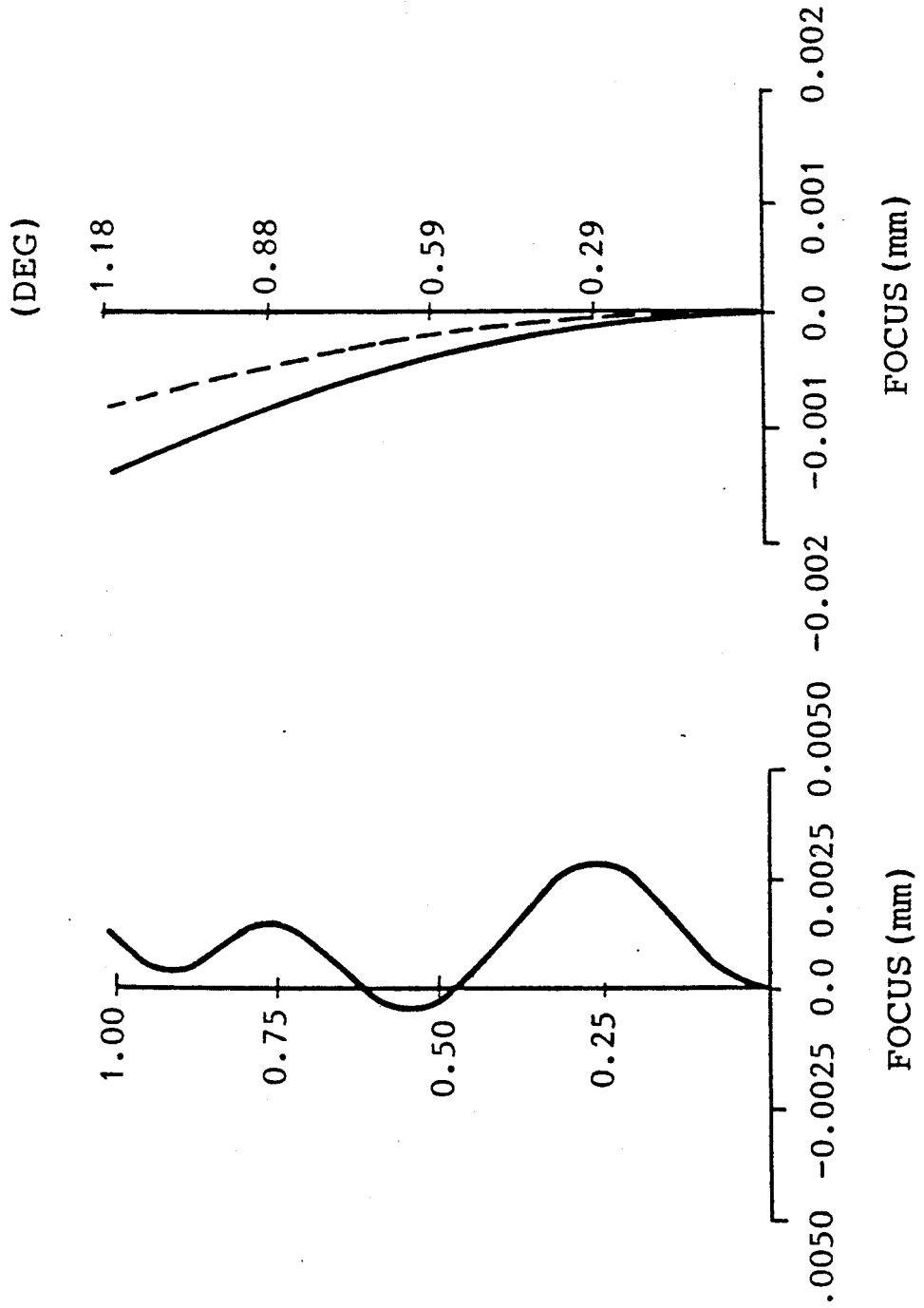

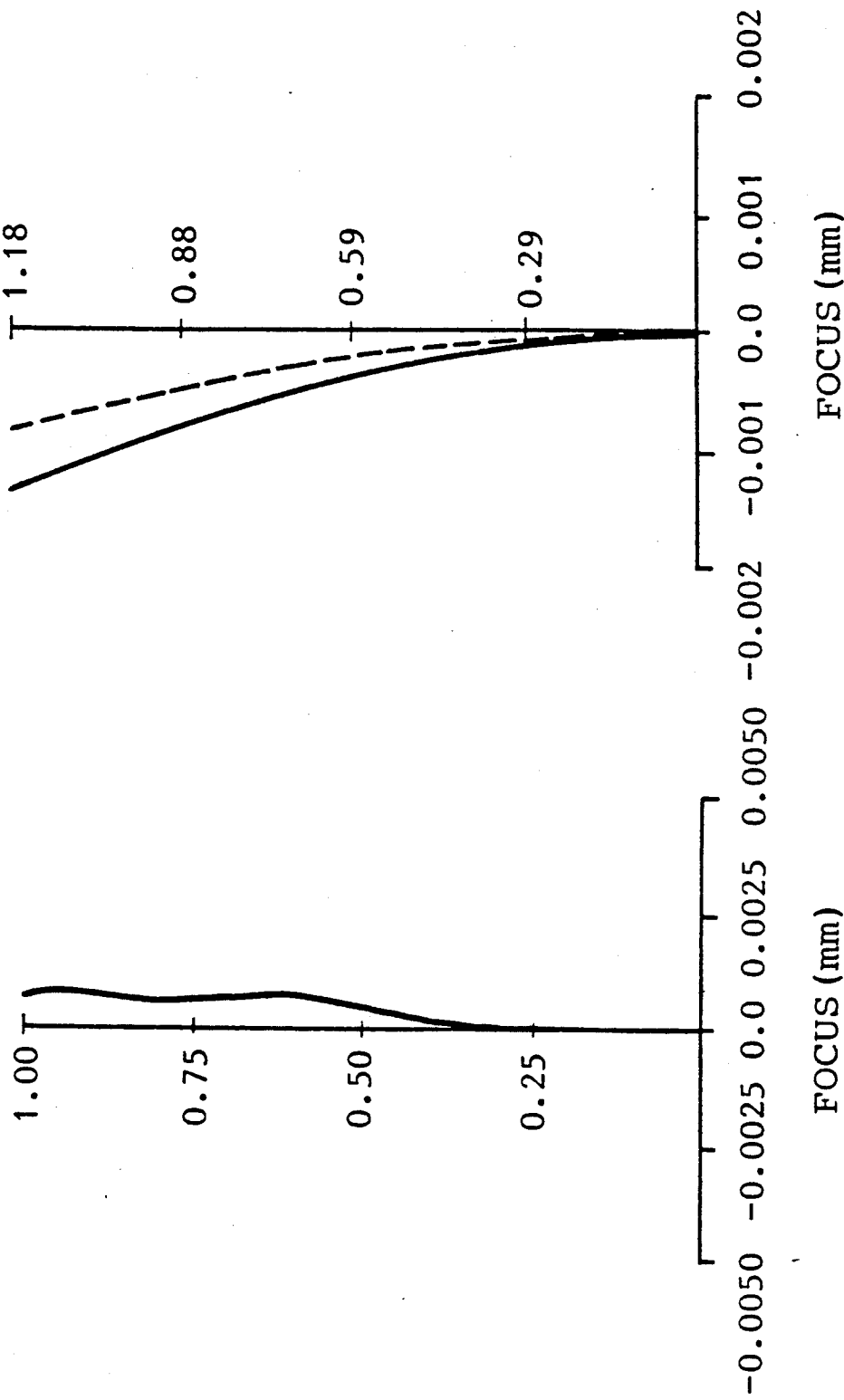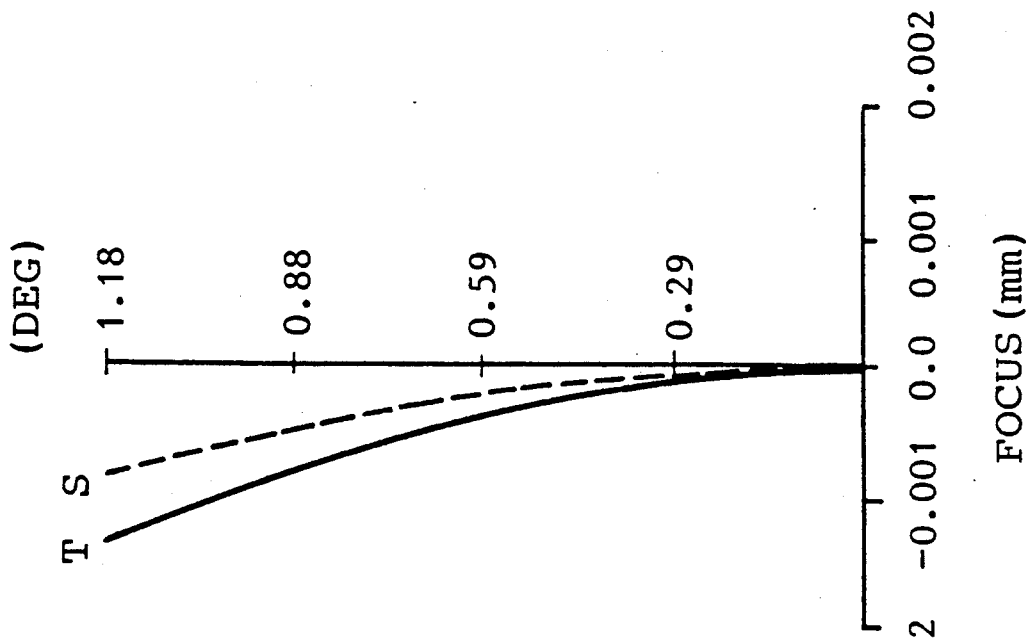

ASPHERICAL GLASS LENS ELEMENT FORMED BY A LOW DISPERSION GLASS MATERIAL

BACKGROUND OF THE INVENTION

This invention relates to an aspherical lens element for use in an object lens system of a rewritable optical disk device.

In a rewritable or erasable optical disk device of the type described, a laser diode or a semiconductor laser is used to write information on an optical disk. In this event, the semiconductor laser generates a laser beam which has different outputs or amplitudes on a write-in operation or on a readout operation. In other words, the outputs of the laser beam are widely varied between the write-in operation and the readout operation. When the outputs of the laser beam are widely varied, a distribution of oscillation wavelengths is also varied during each of the write-in operation and the readout operation.

In the meanwhile, a double-aspherical plastic lens element is disclosed by Arai et al in U.S. Pat. No. 4,449,792 and is widely used in a compact disk player in the form of a single lens element. However, such a double-aspherical plastic lens element is not pertinent for the optical disk device. This is because use of such a double-aspherical plastic lens element results in a wide variation of a focal point which comes from a variation of the oscillation wavelengths. Consequently, it takes a long time to control the focal point by the use of an actuator. This makes it difficult to carry out the write-in and the readout operations at a high speed because the outputs of the semiconductor laser can not be quickly switched from one to another.

On the other hand, consideration might be made about forming an achromatic optical system which comprises a plurality of object lens elements, so as to solve a problem resulting from a variation of the distribution of the oscillation wavelengths. However, such an achromatic optical system is expensive due to an increase of the lens elements and a difficulty of assembly of the lens elements. In addition, the achromatic optical system is heavy in weight and therefore makes a high speed operation difficult on controlling the focal point. Therefore, the achromatic optical system is not practically effective to solve the above-mentioned problem.

Alternatively, proposals have been offered about using a double-aspherical lens element which is formed by a low dispersion glass material and which may be referred to as a double-aspherical glass lens element which has an entrance or first surface and an exit or second surface. The double-aspherical glass lens element can be readily manufactured by glass molding. When such a double-aspherical glass lens element is used as the object lens element of the optical disk device mentioned above, it is possible to extremely reduce or decrease a variation of a focal point due to a variation of oscillation wavelengths in comparison with the double-aspherical plastic lens element mentioned above. This shows that the double-aspherical glass lens element can control the focal point within a very short time and can thereby carry out the write-in and the readout operations at a high speed.

In addition, inasmuch as the low dispersion glass material itself has excellent heat resistance, humidity durability, and temperature characteristic.

From this fact, it is readily understood that the double-aspherical glass lens element of the low dispersion glass material is very suitable for the object lens element of the rewritable optical disk device.

It is mentioned here that, when a refraction index is measured by the use of a d-line, such low dispersion glass generally has a low refractive index n which is lower than 1.55. Therefore, it is necessary to make a radius of curvature of the entrance of the refraction surface extremely small and to make a thickness of a lens element thick, so as to accomplish a desired focal length by the use of the low dispersion glass.

However, decentration between the first and the second surfaces of each lens element becomes large as the radius of curvature and the thickness are small and thick, respectively, and results in serious aberrations, such as comae. Consequently, it is very difficult to manufacture or produce such a double-aspherical glass lens element having the desired focal length. In addition, the double-aspherical glass lens element becomes heavy in comparison with the double-aspherical plastic lens element and with an increase of the thickness of the double-aspherical glass lens element. As a result, it is difficult to carry out tracking control and focal control at a high speed.

SUMMARY OF THE INVENTION

It is an object of this invention to provide an aspherical glass lens element which is light in weight and which is capable of avoiding decentration between an entrance and an exit surface.

It is another object of this invention to provide an aspherical glass lens element of the type described, which is capable of readily being manufactured without degradation of performance.

An aspherical lens element to which this invention is applicable is formed by a glass material and which has an optical axis, a focal length f, a thickness D along the optical axis, and first and second aspherical convex surfaces. The first and the second aspherical convex surfaces have first and second apexes through which the optical axis passes, first and second radii $r_1$ and $r_2$ of curvature at the first and the second apexes, and first and second coefficients $k_1$ and $k_2$ of cones, respectively, and are determined by first and second predetermined formulae, respectively. Each of the first and the second formula are given by:

$$Z_i = [C_i Y^2 / [1 + (1 - (1+k_i)C_i^2 Y^2)^{\frac{1}{2}}]] + E_i Y^4 + F_i Y^6 + G_i Y^8 + H_i Y^{10},$$

where i takes 1 and 2 corresponding to the first and the second convex surfaces, respectively; Y is representative of an incident height from the optical axis; $Z_i$ is representative of a distance between a point placed on an i-th convex surface of the first and the second convex surfaces at the incident height Y and a tangential plane which is tangential to the i-th convex surface at the apex of the i-th convex surface; $C_i$ is representative of curvature of the apex of the i-th convex surface and is equal to a reciprocal of each radius $r_i$; $k_i$ is representative of a coefficient of cone of the i-th convex surface; $E_i$, $F_i$, $G_i$, and $H_i$ are representative of aspherical coefficients of the i-th convex surface which are proportional to fourth, sixth, eighth, and tenth power of the incident height Y, respectively.

According to this invention, the aspherical lens element is defined by:

$$1.5 < (f/D) < 1.9.$$

$$-0.4 < (r_1/r_2) < -0.2,$$

and $$10 < k_1 \cdot k_2 - 1000 E_1 < 30,$$

the glass material being specified by:

$$1.44 < n < 1.55,$$

and $$75 < \nu < 90,$$

where n is representative of a refractive index of the glass material and $\nu$, an Abbe number of the glass material.

BRIEF DESCRIPTION OF THE DRAWING

FIGS. 4(A) through (E) are similar graphical representations of optical characteristics according to a third embodiment of this invention;

FIGS. 5(A) through (E) are similar graphical representations of optical characteristics according to a fourth embodiment of this invention.

Figure 1:
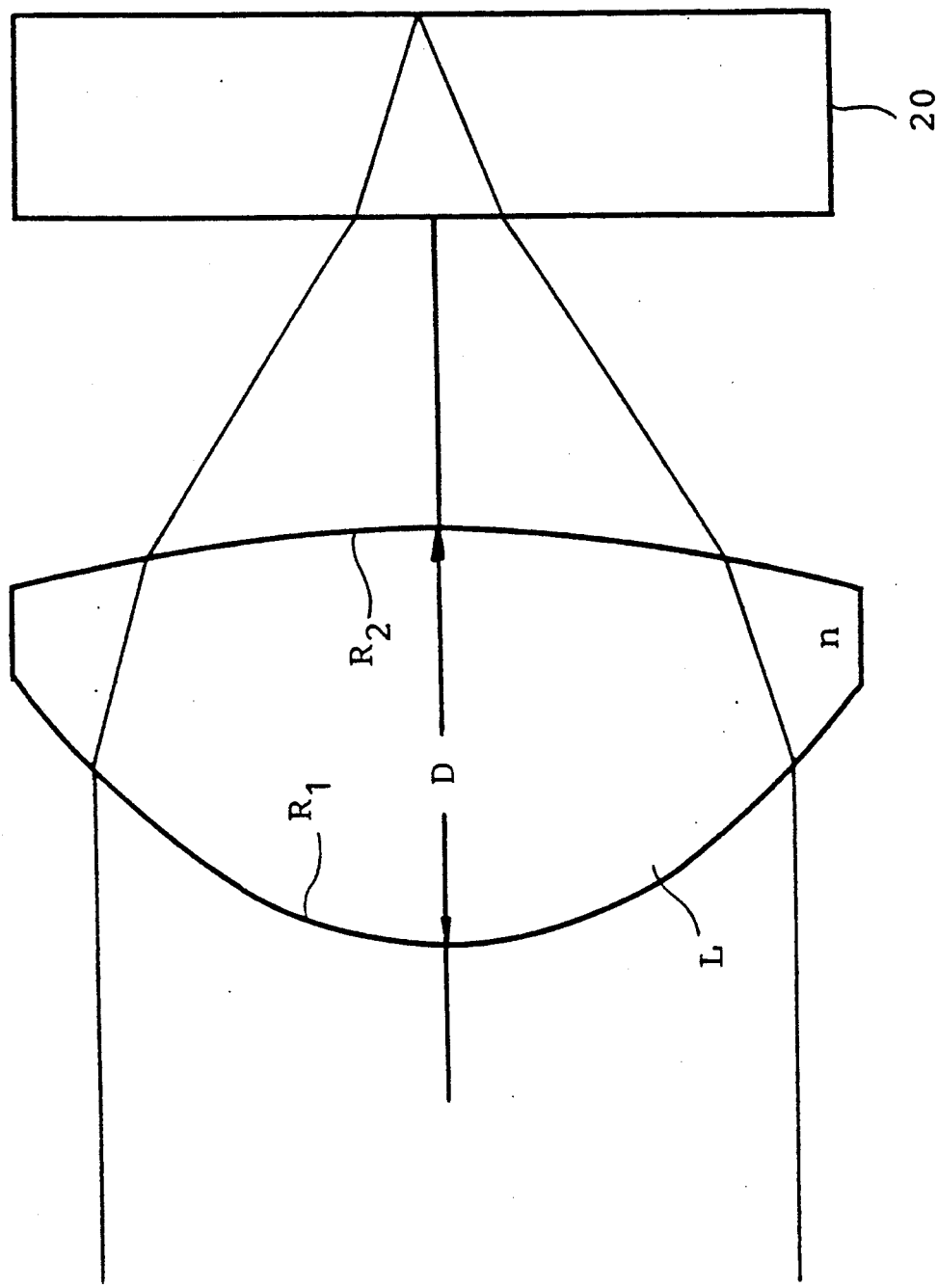
FIG. 1 shows a side view of an optical system which is for use in an optical disk device and which comprises an aspherical lens element according to this invention.

DESCRIPTION OF THE PREFERRED EMBODIMENTS:

Referring to FIG. 1, an aspherical lens element L according to a preferred embodiment of this invention is for use in an object lens element of an optical disk device which has a disk cover plate 20 having a front surface and a rear surface located on the lefthand and the righthand sides of FIG. 1, respectively. In this case, the rear surface of the disk cover plate 20 forms a disk recording surface. The illustrated aspherical lens element L is designed for an optical system including the disk cover plate 20 and has an entrance or first surface $R_1$ directed leftwards of FIG. 1 and an exit or second surface $R_2$ directed rightwards.

It is assumed that the aspherical lens element L is designed so that a numerical aperture N.A. is equal to or greater than 0.5 and that a corrected aberration of the aspherical lens element L on axis falls within a diffraction limit of light while an offaxial aberration is preferably corrected. Preferably, the aspherical lens element L has a long working distance W.D. between the second surface $R_2$ and the front surface of the disk recording surface.

In addition, the aspherical lens element L is manufactured by molding a low dispersion glass material which generally has a refractive index n and an Abbe number $\nu$ falling within the following ranges:

$$1.44 < n < 1.55 \text{ and} \tag{1}$$

$$75 < \nu < 90, \text{ respectively.} \tag{2}$$

In this event, the refractive index n is measured by the use of a d-line.

Thus, the low dispersion glass material has a low refractive index smaller than 1.55. Such glass molding is carried out by the use of a mold which is precisely machined to provide the first and the second surfaces $R_1$ and $R_2$ of the aspherical lens element L. Specifically, the low dispersion glass material is introduced into the mold on manufacturing the aspherical lens element L and is pressed within the mold into the aspherical lens element L. This method dispenses with grinding and polishing necessary for manufacturing the aspherical lens element L.

The aspherical lens element L is a double-convex aspherical lens element, as shown in FIG. 1, and the first and the second surfaces $R_1$ and $R_2$ may be therefore called first and second aspherical convex surfaces, respectively. The first and the second aspherical convex surfaces $R_1$ and $R_2$ have axially symmetric configurations with respect to the axis or optical axis and first and second apexes through which the optical axis passes, respectively. In addition, the first and the second aspherical convex surfaces $R_1$ and $R_2$ have first and second radii $r_1$ and $r_2$ of curvature at the first and the second apexes and first and second coefficients $k_1$ and $k_2$ of cones and are defined by first and second formulae, respectively. Each of the first and the second formula is collectively given by:

$$Z_i = [C_i Y^2/[1+(1-(1+k_i)C_i^2 Y^2)^{\frac{1}{2}}]] + E_i Y^4 + F_i Y^6 + G_i Y^8 + H_i Y^{10}, \tag{3}$$

where i takes 1 and 2 corresponding to the first and the second convex surfaces $R_1$ and $R_2$, respectively; Y is representative of an incident height from the optical axis; $Z_i$ is representative of a distance between a point placed on an i-th convex surface of the first and the second convex surfaces $R_1$ and $R_2$ at the incident height Y and a tangential plane which is tangential to the i-th convex surface at the apex of the i-th convex surface; $C_i$ is representative of curvature of the apex of the i-th convex surface and is equal to a reciprocal of each radius $r_i$; $k_i$ is representative of a coefficient of cone of the i-th convex surface; and $E_i$, $F_i$, $G_i$, and $H_i$ are representative of aspherical coefficients of the i-th convex surface which are proportional to fourth, sixth, eighth, and tenth power of the incident height Y, respectively.

A focal length and a thickness along the optical axis are assumed to be depicted at f and D in the aspherical lens element L, respectively. The illustrated aspherical lens element L is designed so as to satisfy the following inequalities:

$$1.5 < (f/D) < 1.9, \tag{4}$$

$$-0.4 < (r_1/r_2) < -0.2, \tag{5}$$

and $$10 < k_1 \cdot k_2 - 1000 E_1 < 30. \tag{6}$$

As mentioned before, the aspherical lens element L must be light in weight enough to enable high speed operations on tracking control of the optical disk device and focal control. To this end, a relationship between the thickness D and the focal length f is determined by a term (f/D) of Inequality (4).

Specifically, when the term (f/D) is smaller than 1.5, the thickness D becomes too thick in comparison with the focal length f. As a result, the working distance W.D. becomes short even when refractive power is pertinently balanced between the first and the second aspherical convex surfaces $R_1$ and $R_2$. Moreover, such an aspherical lens element is heavy under the above-mentioned condition and consequently makes the high speed operations difficult.

On the other hand, when the term (f/D) exceeds 1.9, the thickness D becomes excessively thin as compared with the focal length f. As a result, curvature of each surface must be decreased. This undesirably lessens a tolerance for the decentration between the first and the second aspherical convex surfaces $R_1$ and $R_2$ even when Inequality (4) is satisfied. Accordingly, it is difficult to practically manufacture such a lens element.

In order to preferably correct aberrations on axis and offaxial aberrations, the term ($r_1/r_2$) must be selected within a range determined by Inequality (5). In other words, Inequality (5) is defined to effectively correct the aberrations due to an aspherical effect. More particularly, if the term ($r_1/r_2$) is smaller than −0.4, comae can not be corrected and degrades performance for offaxial rays. To the contrary, if the term ($r_1/r_2$) is greater than −0.2, it is difficult to correct, on the second aspherical convex surface $R_2$, a spherical aberration which occurs on the first aspherical convex surface. Consequently, the performance for the offaxial rays is degraded.

Thus, Inequalities (4) and (5) define conditions for improving performance on designing the lens element.

Next, description will be made about Inequality (6). It is recollected here that the low dispersion glass material is used to manufacture the aspherical lens element L and therefore has a low refractive index, as specified by Inequality (1). As a result, when the thickness D is designed so that it satisfies Equation (3), each curvature of the first and the second aspherical convex surfaces $R_1$ and $R_2$ must be rendered very small. This results in an increase of decentration which might occur on mass production between the first and the second aspherical convex surfaces $R_1$ and $R_2$ and which especially appears as parallel decentration of the optical axis between the first and the second aspherical convex surfaces $R_1$ and $R_2$. The increase of the decentration makes comae serious with respect to optical rays on axis and makes it difficult to mass-produce lens elements.

Inequality (6) is determined in consideration of the comae and a precision for positioning the mold on mass production. Specifically, if a term of ($k_1 \cdot k_2 - 1000 E_1$) exceeds an upper limit in Inequality (6), it has been confirmed that occurrence of the coma which results from the parallel decentration reaches an unacceptable value. On the other hand, if the term specified by Inequality (6) exceeds a lower limit, correction of aberration becomes difficult on designing. This means that the tolerance on manufacturing can not be considered on designing. Thus, Inequality (6) specifies a condition for lowering a reduction of performance due to an error which occurs on manufacturing.

Now, Tables 1 and 2 show first through fourth embodiments which are designed in accordance with this invention so that the formulae (1) through (6) hold.

TABLE 1

|  | Embodiment 1 | Embodiment 2 |
|---|---|---|
| f | 3.9 | 3.9 |
| D | 2.2 | 2.515212 |
| $r_1$ | 2.31436 | 2.41980 |
| $k_1$ | −0.641197 | −0.619211 |
| $E_1$ | $0.500038 \times 10^{-3}$ | $0.133364 \times 10^{-2}$ |
| $F_1$ | $-0.461359 \times 10^{-4}$ | $-0.131515 \times 10^{-3}$ |
| $G_1$ | $-0.477246 \times 10^{-5}$ | $-0.335936 \times 10^{-4}$ |
| $H_1$ | $-0.136835 \times 10^{-5}$ | $-0.879883 \times 10^{-5}$ |
| $r_2$ | −7.71712 | −6.09722 |
| $k_2$ | −26.983856 | −27.284015 |
| $E_2$ | $-0.765033 \times 10^{-3}$ | $0.947233 \times 10^{-3}$ |
| $F_2$ | $0.204227 \times 10^{-3}$ | $-0.242074 \times 10^{-3}$ |
| $G_2$ | $-0.286799 \times 10^{-4}$ | $-0.675909 \times 10^{-4}$ |
| $H_2$ | $0.143377 \times 10^{-5}$ | $0.101354 \times 10^{-4}$ |
| f/D | 1.7727 | 1.5506 |
| $r_1/r_2$ | −0.2999 | −0.3969 |
| $k_1 \cdot k_2 - 1000 \times E_1$ | 16.802 | 15.561 |

TABLE 2

|  | Embodiment 3 | Embodiment 4 |
|---|---|---|
| f | 3.9 | 3.9 |
| D | 2.2 | 2.378936 |
| $r_1$ | 2.34916 | 2.35466 |
| $k_1$ | −3.5 | −2.0165 |
| $E_1$ | $0.274661 \times 10^{-1}$ | $0.137379 \times 10^{-1}$ |
| $F_1$ | $-0.408015 \times 10^{-2}$ | $-0.795633 \times 10^{-3}$ |
| $G_1$ | $0.597931 \times 10^{-3}$ | $0.116552 \times 10^{-3}$ |
| $H_1$ | $-0.424726 \times 10^{-4}$ | $-0.112379 \times 10^{-4}$ |
| $r_2$ | −7.24785 | −6.92042 |
| $k_2$ | −10.715368 | −16.893385 |
| $E_2$ | $0.441845 \times 10^{-2}$ | $0.193157 \times 10^{-2}$ |
| $F_2$ | $-0.698754 \times 10^{-3}$ | $0.379598 \times 10^{-4}$ |
| $G_2$ | $0.524062 \times 10^{-4}$ | $-0.118091 \times 10^{-3}$ |
| $H_2$ | $-0.579063 \times 10^{-5}$ | $0.123013 \times 10^{-4}$ |
| f/D | 1.7727 | 1.639 |
| $r_1/r_2$ | −0.3241 | −0.3402 |
| $k_1 \cdot k_2 - 1000 \times E_2$ | 10.038 | 20.328 |

Figure 2B:
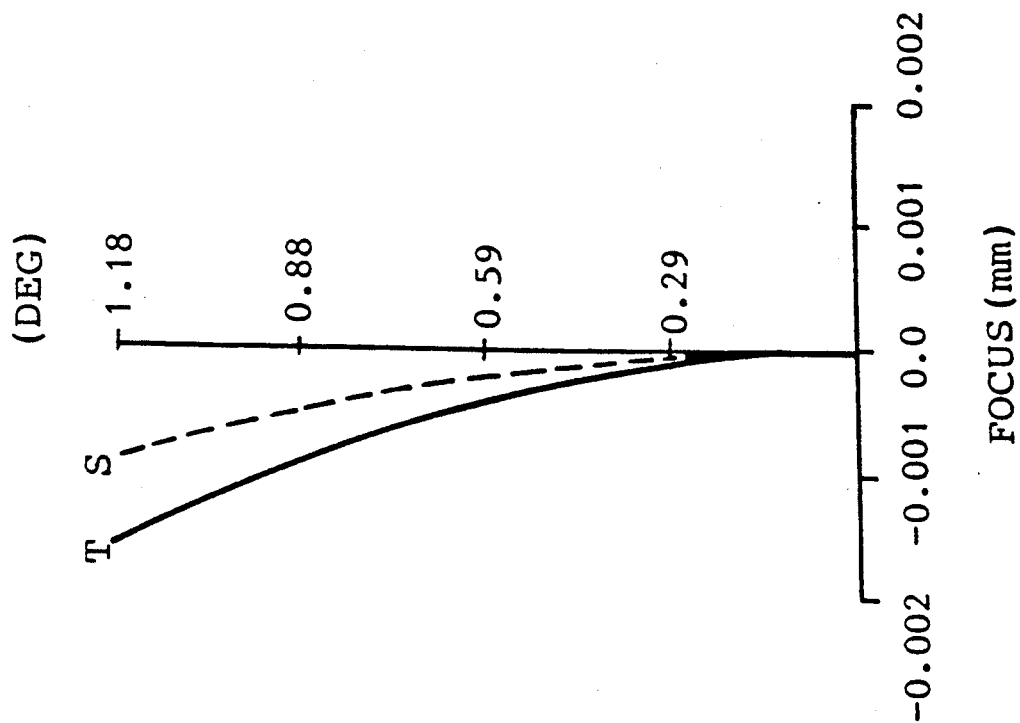
FIGS. 2(A) through (E) are graphical representations of optical characteristics of an aspherical lens element according to a first embodiment of this invention.
Figure 2A:
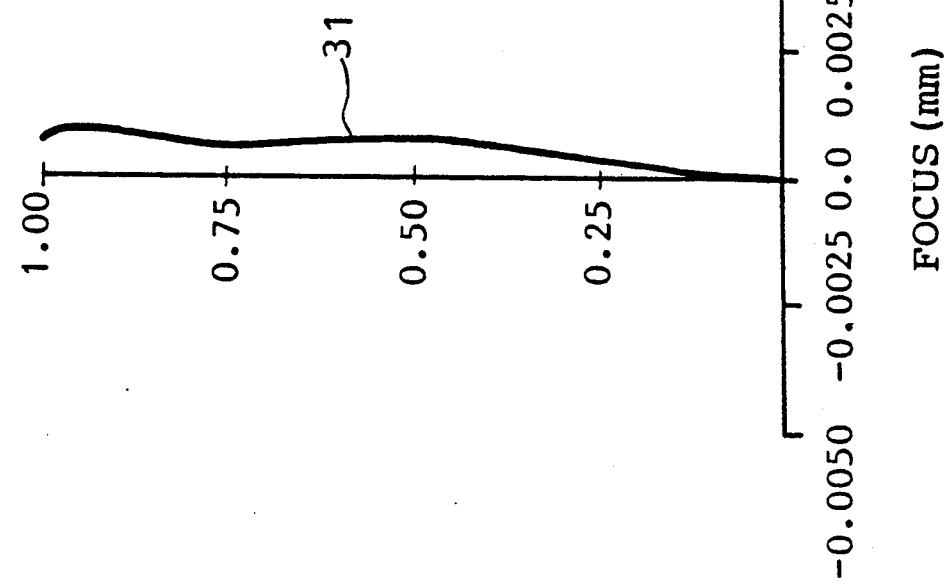

Referring to FIGS. 2(A) through (E), illustrations are made about optical characteristics of the aspherical lens element according to the first embodiment of this invention shown in Table 1. More specifically, the optical characteristics are specified by a spherical aberration and an astigmatism shown in FIGS. 2(A) and (B), respectively. In FIG. 2(A), an ordinate represents a ratio of a relative height of an incident parallel ray from the optical axis and a height of an aperture stop on the assumption that the height of the aperture stop is kept at unity. An abscissa represents a position at which the incident rays intersect the optical axis. An origin of the graph is representative of a focal point while plus and minus regions of FIG. 2(A) correspond to righthand and lefthand side portions along the optical axis of FIG. 1, respectively. As shown in FIG. 2(A), the aspherical lens element L according to the first embodiment of this invention has the spherical aberration specified by a spherical aberration curve 31.

In FIG. 2(B), an ordinate represents a half field angle of offaxial rays while an abscissa represents a light focusing point at each field angle in terms of a dislocation of the focal point along the optical axis. In this figure, curves T and S represent the light focusing points on tangential and sagittal planes, respectively.

Figure 2C:
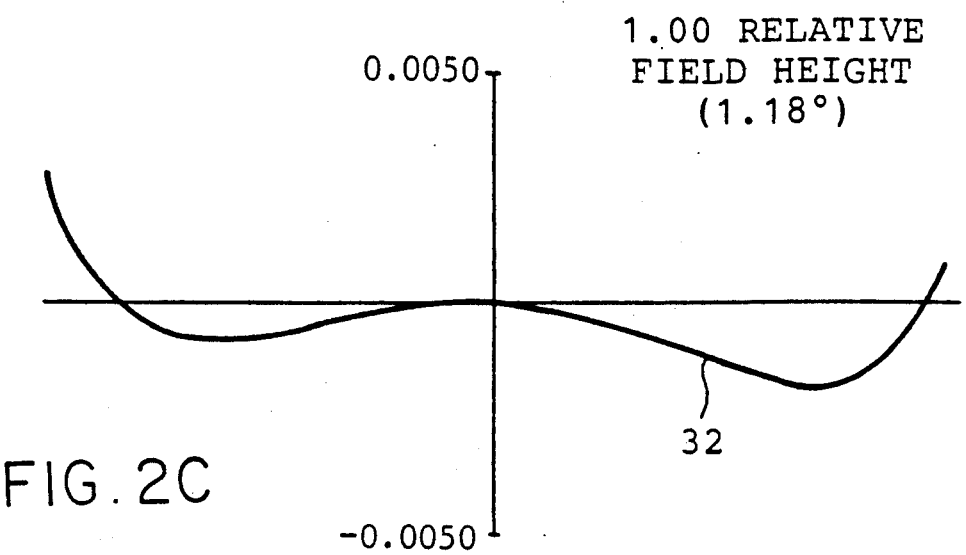

In addition, FIGS. 2(C), (D), and (E) show first, second, and third comae which are calculated in the tangential directions with respect to an incident ray given at a field angle of 100%, at a field angle of 50%, and on an axis, respectively, and which are depicted at curves 32, 33, and 34, respectively. As well known in the art, the abscissa and the ordinate of each of FIGS.

(C) through (E) represent a distance from a principal ray and a difference height between the principal ray and a tracing ray, respectively.

Figure 3B:
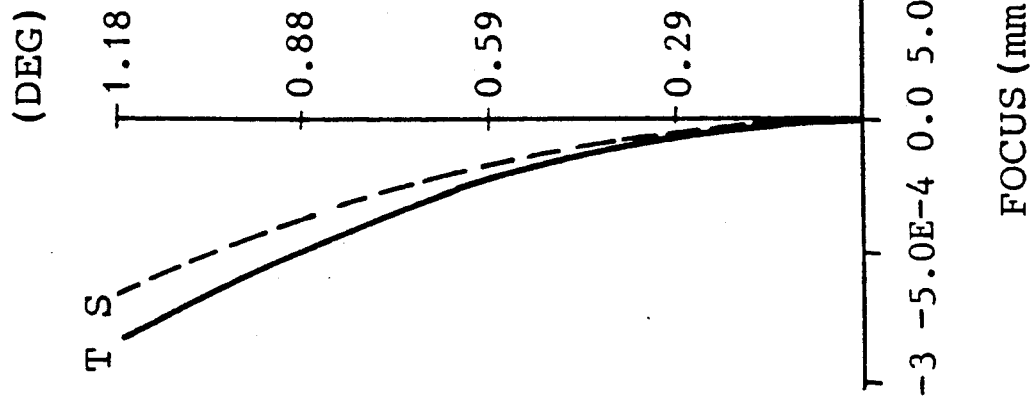
FIGS. 3(A) through (E) are similar graphical representations of optical characteristics of an aspherical lens element according to a second embodiment of this invention.
Figure 3A:
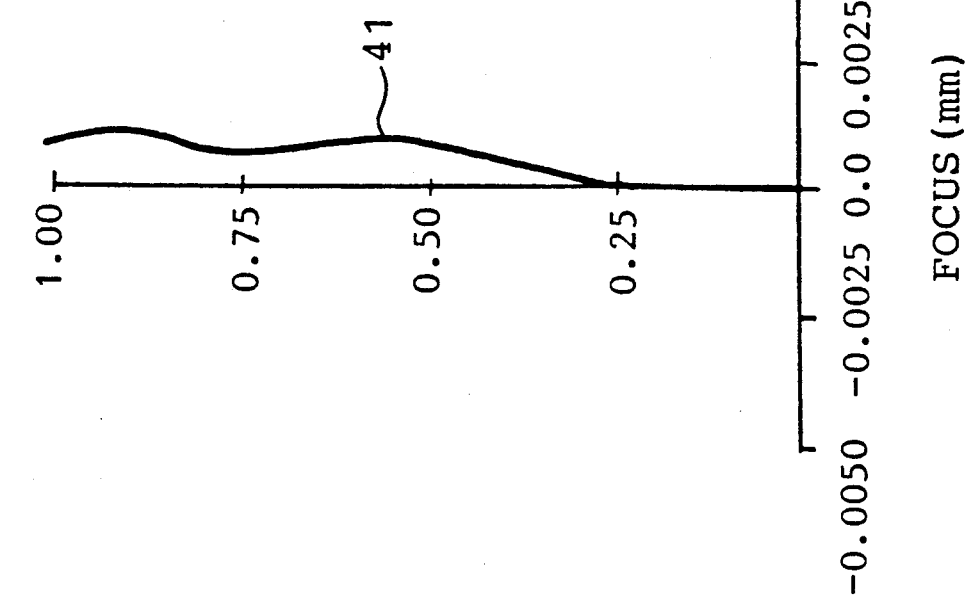

Referring to FIGS. 3(A) and (B), a spherical aberration and astigmatism of the aspherical lens element according to the second embodiment of this invention are illustrated in manners similar to those of FIGS. 2(A) and (B), respectively. The spherical aberration and the astigmatism of the second embodiment are specified by curves 41 and T and S, as shown in FIGS. 3(A) and (B).

Figure 2D:
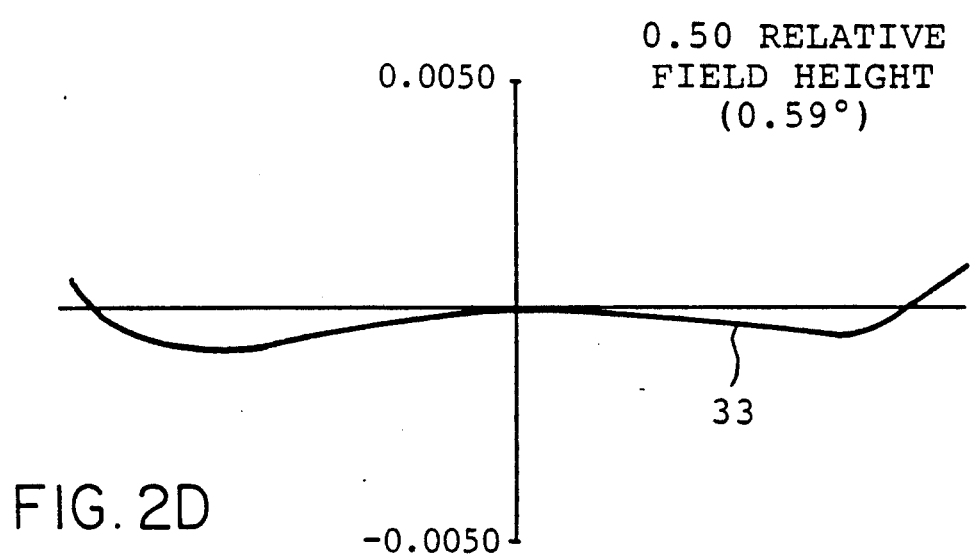
Figure 2E:
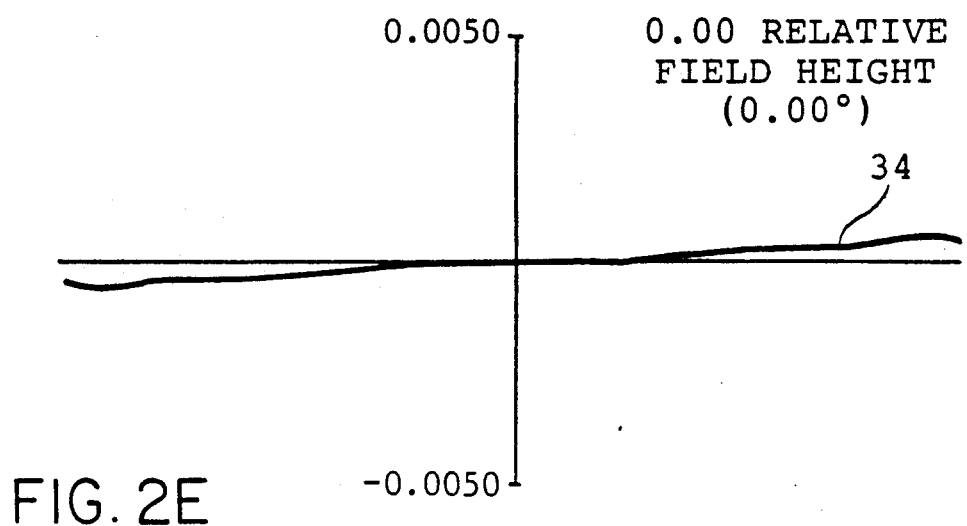
Figure 3C:
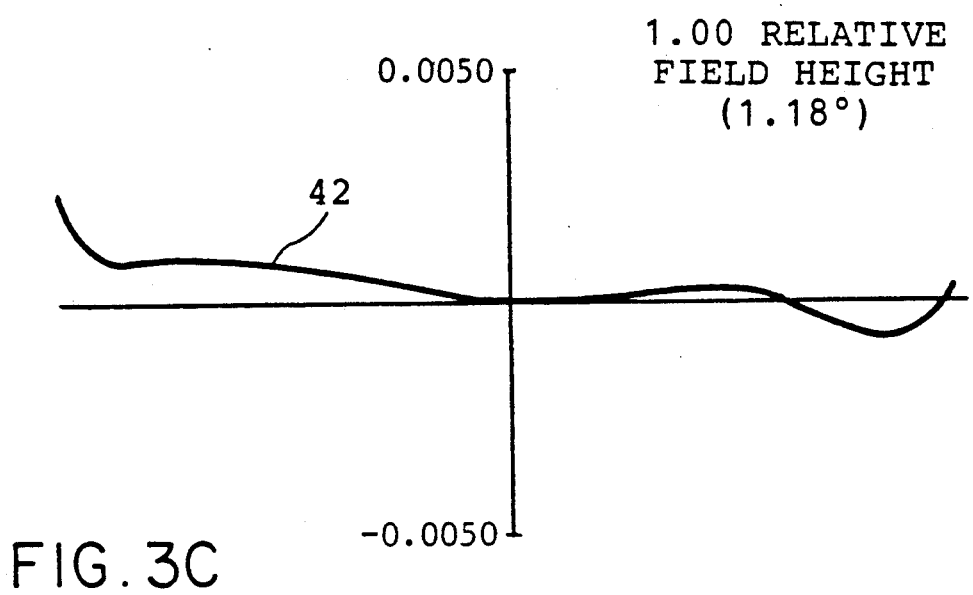
Figure 3D:
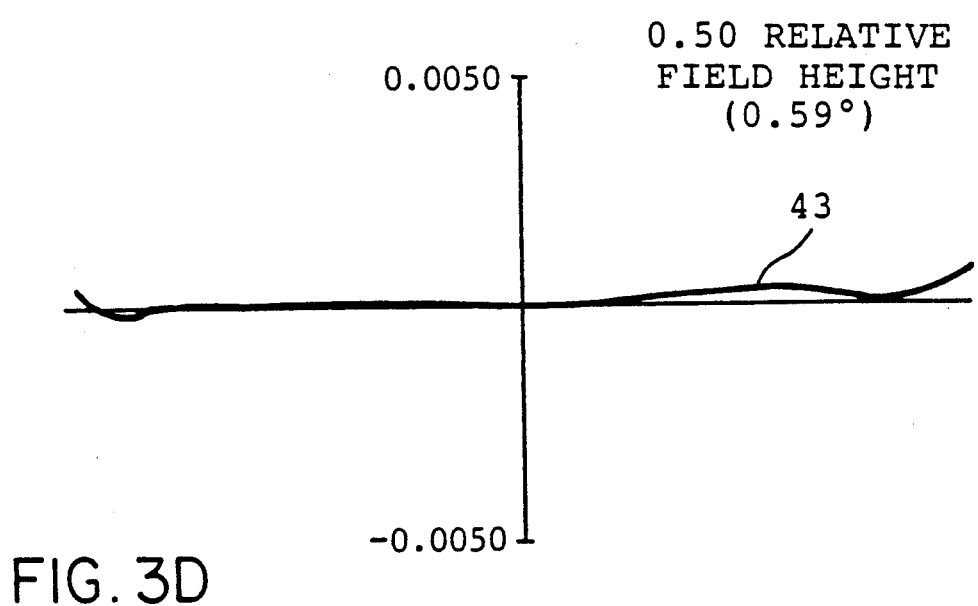
Figure 3E:
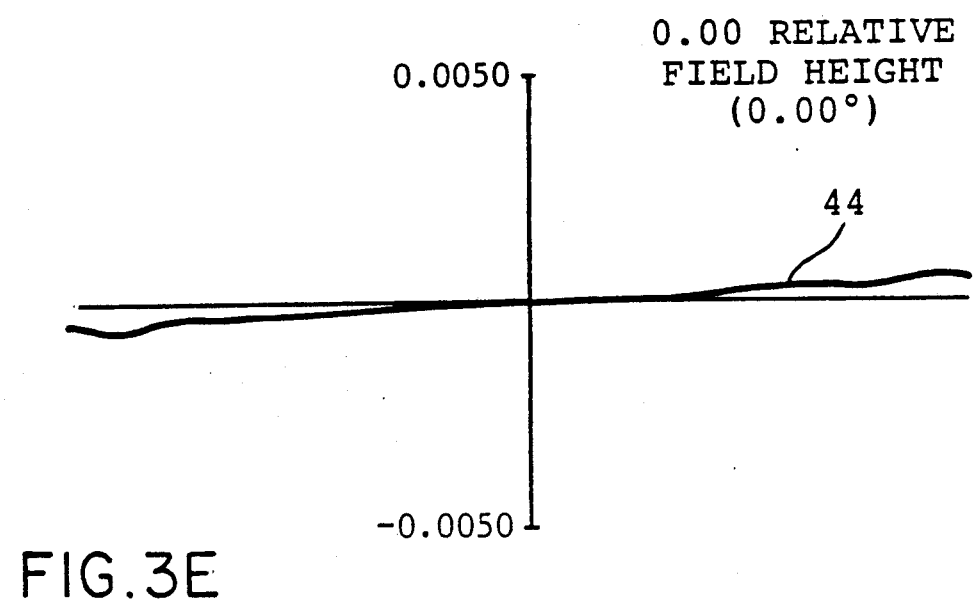
Figure 4C:
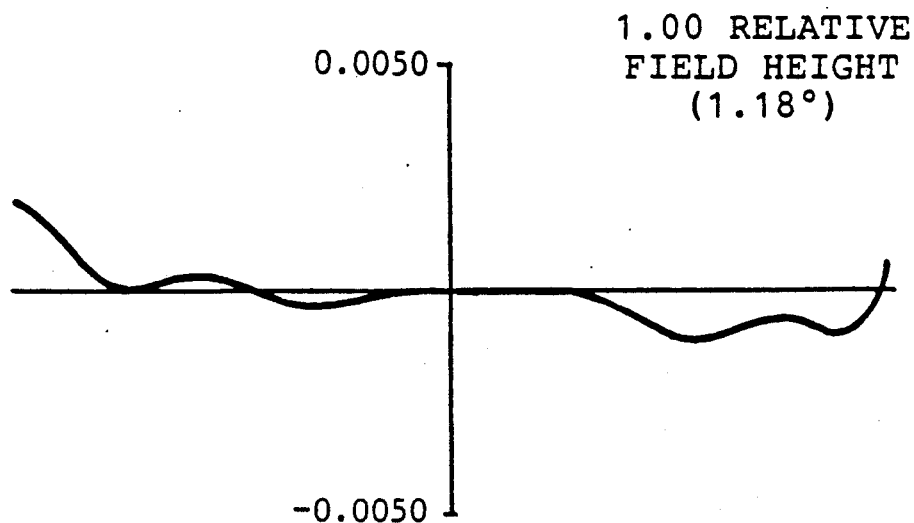
Figure 4D:
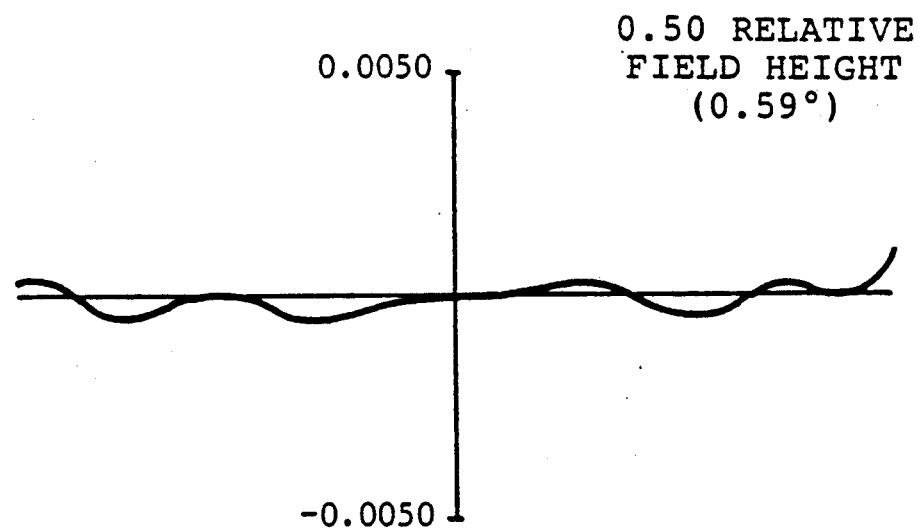
Figure 4E:
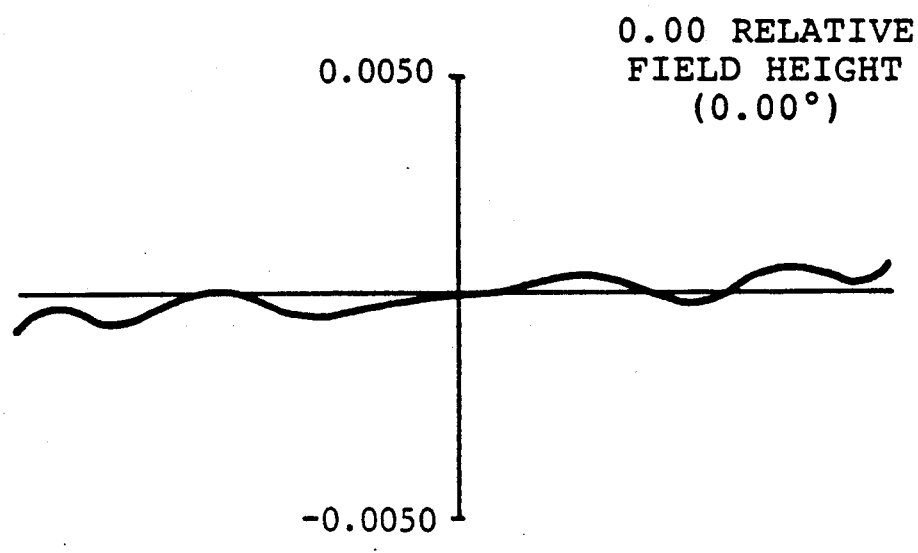
Figure 5C:
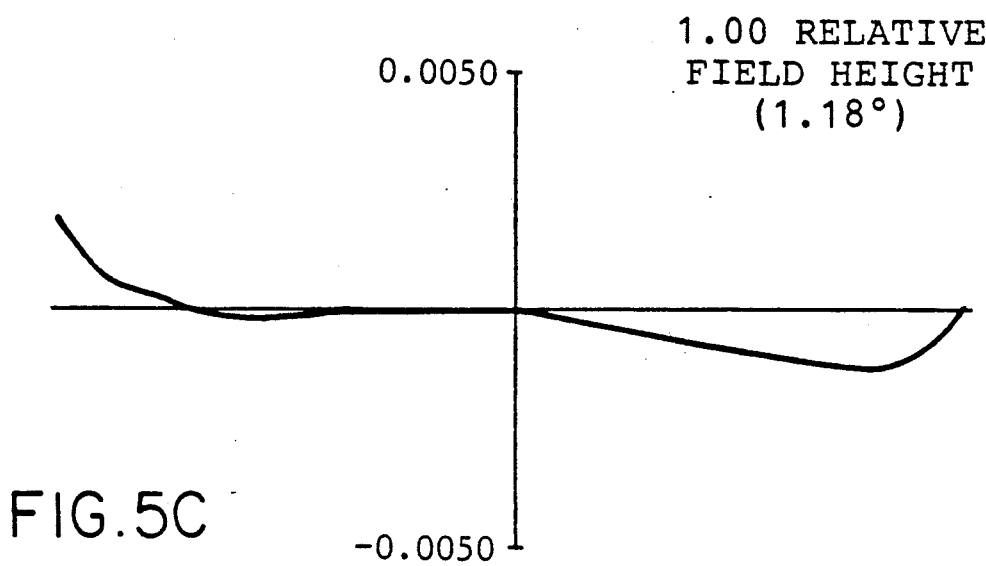
Figure 5D:
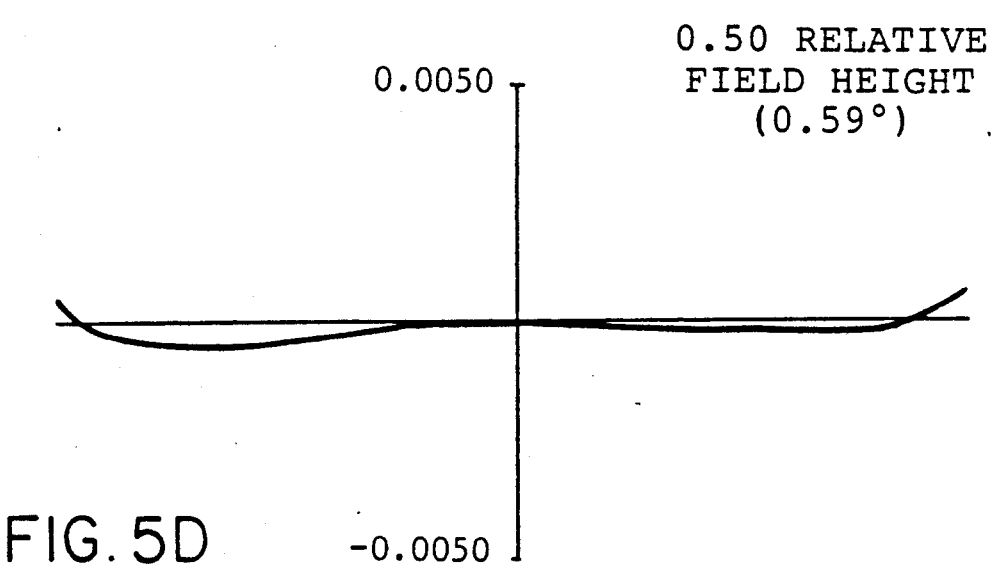
Figure 5E:
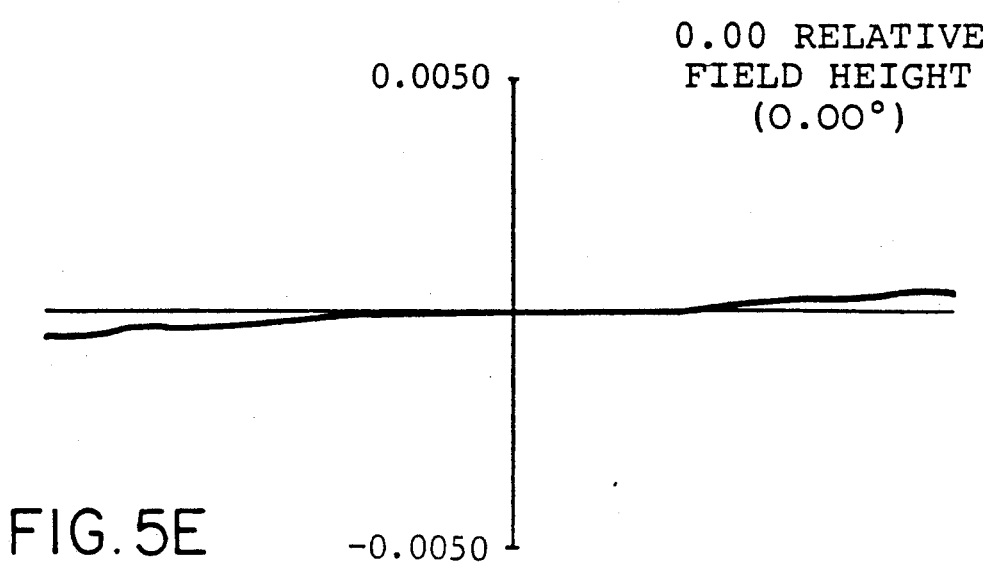

Likewise, FIGS. 3(C) through (E) show comae specified by curves 42, 43, and 44, like FIGS. 2(C) through (E), respectively.

Referring to FIGS. 4(A) through (E), illustrations are made about the spherical aberration, the astigmatism, and the comae of the aspherical lens element L according to the third embodiment in manners similar to those of FIGS. (A) through (E), respectively.

Similarly, FIGS. 5(A) through (E) show the spherical aberration, the astigmatism, and the comae of the fourth embodiment of this invention, like FIGS. 2(A) through (E), respectively.

At any rate, the aspherical lens elements L according to the first through the fourth embodiments of this invention have excellent optical characteristics, as shown in FIGS. 2 through 5 even when the aspherical lens element L is manufactured by mass production.

Figure 6:
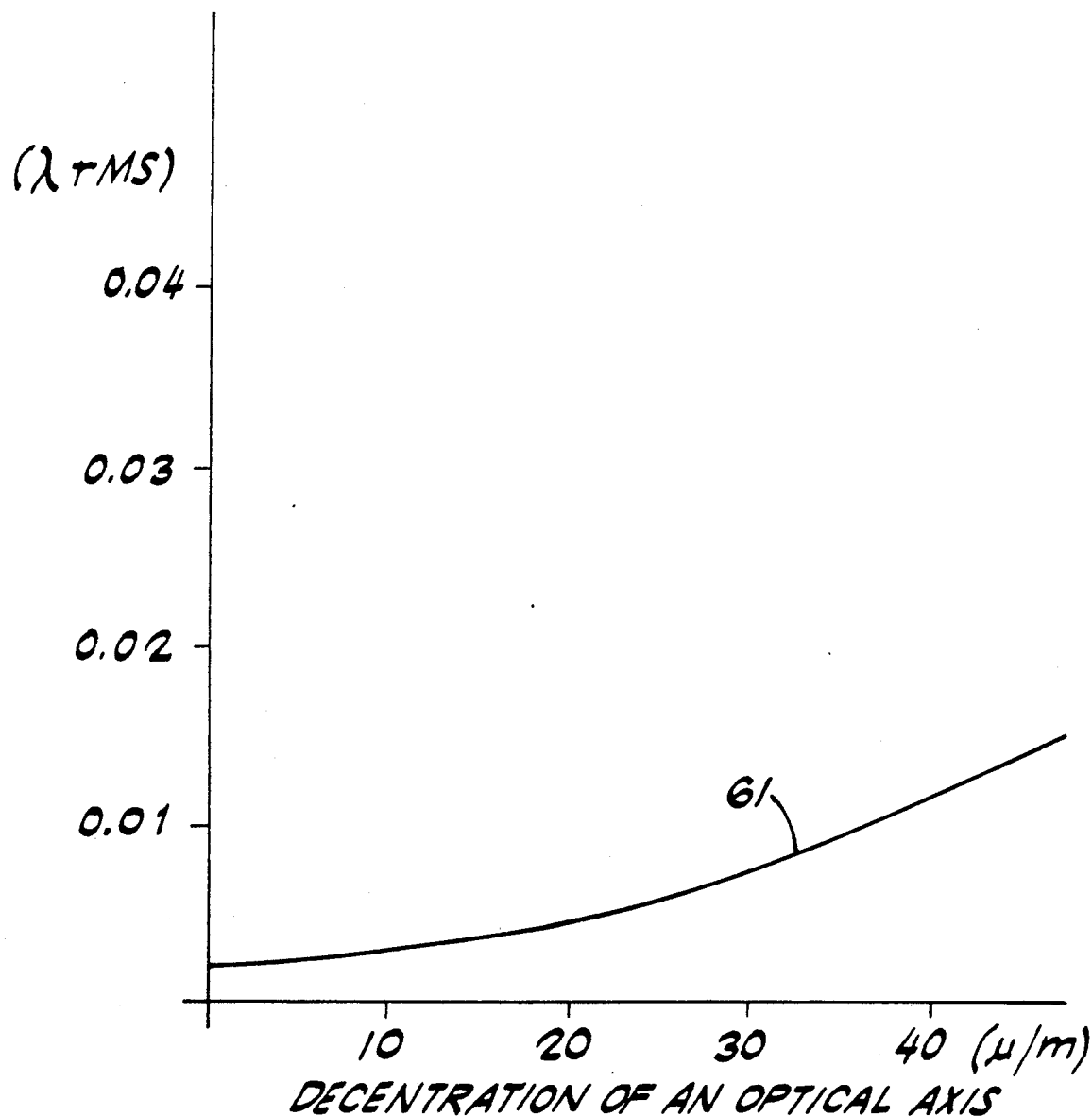
FIG. 6 is a graphical representation of a relationship between a wave aberration and a decentration of an optical axis in the aspherical lens element according to the second embodiment of this invention.

Referring to FIG. 6, the aspherical lens element L according to the second embodiment of this invention is specified by a curve 61 which represents a relationship between a wave aberration λ rms and parallel decentration of the optical axis between the first and the second aspherical convex surfaces $R_1$ and $R_2$. Specifically, the wave aberration is taken along an ordinate of FIG. 6 and the decentration (micron meter) of the optical axis is taken along an abscissa. As shown in FIG. 6, the wave aberration can be restricted to a range lower than 0.01 λ rms even when the decentration is increased to 30 micron meter. From this fact, it is readily understood that the aspherical lens element according to this invention can be manufactured within the tolerance allowable on mass production.

In addition, when the low dispersion glass material has a glass transformation temperature Tg higher than 430° C., it is possible to improve the heat resistance, the humidity durability, and the temperature characteristic.

With this structure, it is possible to provide the aspherical lens element L which has a light weight enough to enable high speed operation on tracking control and focal point control of the optical disk device and which has aberrations confined within the diffraction limit of light. Moreover, when such an aspherical lens element L is used for the rewritable optical disk device, the focal point is quickly controlled because the focal point is only subtly moved when wavelengths are varied due to switching the outputs of the semiconductor laser from one to another. This means that the write-in and the readout operations can be carried out at a high speed. In addition, inasmuch as the aspherical lens element L is designed so as to satisfy Inequality (6), it is possible to minimize degradation of performance resulting from the decentration of the optical axis between the first and the second aspherical convex surfaces.

While this invention has thus far been described in conjunction with several embodiments thereof, it will readily be possible for those skilled in the art to put this invention into practice in various other manners.

What is claimed is:

1. An aspherical lens element which is formed by a glass material and which has an optical axis, a focal length f, a thickness D along said optical axis, and first and second aspherical convex surfaces, said first and said second aspherical convex surfaces having first and second apexes through which said optical axis passes, first and second radii $r_1$ and $r_2$ of curvature at said first and said second apexes, and first and second coefficients $k_1$ and $k_2$ of cones, respectively, and being determined by first and second predetermined formulae, respectively, wherein each of said first and said second formula are given by:

$$z_i = [C_i Y^2 / [1 + (1 - (1 + K_i) C_i^2 Y^2)^{\frac{1}{2}}]] + E_i Y^4 + F_i Y^6 + G_i Y^8 + H_i Y^{10},$$

where i takes 1 and 2 corresponding to said first and said second convex surfaces, respectively; Y is representative of an incident height from the optical axis; $z_i$ is representative of a distance between a point placed on an i-th convex surface of said first and said second convex surfaces at the incident height Y and a tangential plane which is tangential to said i-th convex surface at the apex of said i-th convex surface; $C_i$ is representative of curvature of the apex of said i-th convex surface and is equal to a reciprocal of each radius $r_i$; $k_i$ is representative of a coefficient of cone of said i-th convex surface; $E_i$, $F_i$, $G_i$, and $H_i$ are representative of aspherical coefficients of said i-th convex surface which are proportional to fourth, sixth, eighth, and tenth power of the incident height Y, respectively;

said aspherical lens element being defined by:
$$1.5 < (f/D) < 1.9,$$

$$-0.4 < (r_1/r_2) < -0.2,$$

and $$10 < k_1 \cdot k_2 - 1000 E_1 < 30,$$

said glass material being specified by:

$$1.44 < n < 1.55,$$

and $$75 < \nu < 90,$$

where n is representative of a refractive index of said glass material and $\nu$ an Abbe number of said glass material.

2. An aspherical lens element as claimed in claim 1, having the following numerical data:
f = 3.9, D = 2.2, $r_1$ = 2.31436, $k_1$ = −0.641197,
$E_1$ = 0.500038 × 10⁻³, $F_1$ = −0.461359 × 10⁻⁴,
$G_1$ = −0.477246 × 10⁻⁵, $H_1$ = −0.136835 × 10⁻⁵,
$r_2$ = −7.71712, $k_2$ = −26.983856,
$E_2$ = −0.765033 × 10⁻³, $F_2$ = 0.204227 × 10⁻³,
$G_2$ = −0.286799 × 10⁻⁴, $H_2$ = 0.143377 × 10⁻⁵,
f/D = 1.7727, $r_1/r_2$ = −0.2999, and
$k_1 \cdot k_2 - 1000 \times E_1$ = 16.802.

3. An aspherical lens element as claimed in claim 1, having the following numerical data:
f = 3.9, D = 2.515212, $r_1$ = 2.41980, $k_1$ = −0.619211,
$E_1$ = 0.133364 × 10⁻², $F_1$ = −0.131515 × 10⁻³,
$G_1$ = 0.335936 × 10⁻⁴, $H_1$ = −0.879883 × 10⁻⁵,
$r_2$ = −6.09722, $k_2$ = −27.284015,
$E_2$ = 0.947233 × 10⁻³, $F_2$ = −0.242074 × 10⁻³, $G_2 = -0.675909 \times 10^{-4}$, $H_2 = 0.101354 \times 10^{-4}$, $f/D = 1.5506$, $r_1/r_2 = -0.3969$, and $k_1 \cdot k_2 - 1000 \times E_1 = 15.561$.

4. An aspherical lens element as claimed in claim 1, having the following numerical data:

$f = 3.9$, $D = 2.2$, $r_1 = 2.34916$, $k_1 = -3.5$, $E_1 = 0.274661 \times 10^{-1}$, $F_1 = -0.408015 \times 10^{-2}$, $G_1 = 0.597931 \times 10^{-3}$, $H_1 = -0.424726 \times 10^{-4}$, $r_2 = -7.24785$, $k_2 = -10.715368$, $E_2 = 0.441845 \times 10^{-2}$, $F_2 = -0.698754 \times 10^{-3}$, $G_2 = 0.524062 \times 10^{-4}$, $H_2 = -0.579063 \times 10^{-5}$, $f/D = 1.7727$, $r_1/r_2 = -0.3241$, and $k_1 \cdot k_2 - 1000 \times E_2 = 10.038$.

5. An aspherical lens element as claimed in claim 1, having the following numerical data:

$f = 3.9$, $D = 2.378936$, $r_1 = 2.35466$, $k_1 = -2.0165$, $E_1 = 0.137379 \times 10^{-1}$, $F_1 = -0.795633 \times 10^{-3}$, $G_1 = 0.116552 \times 10^{-3}$, $H_1 = -0.112379 \times 10^{-4}$, $r_2 = -6.92042$, $k_2 = -16.893385$, $E_2 = 0.193157 \times 10^{-2}$, $F_2 = 0.379598 \times 10^{-4}$, $G_2 = -0.118091 \times 10^{-3}$, $H_2 = 0.123013 \times 10^{-4}$, $f/D = 1.6394$, $r_1/r_2 = -0.3402$, and $k_1 \cdot k_2 - 1000 \times E_2 = 20.328$.

* * * * *